Dec. 27, 1966  H. A. ZACH  3,294,081
FUEL CONSERVER AND HUMIDIFIER FOR WARM AIR FURNACES
Filed Oct. 21, 1965

INVENTOR.
Henry A. Zach
BY
ATTORNEY

United States Patent Office 3,294,081
Patented Dec. 27, 1966

3,294,081
FUEL CONSERVER AND HUMIDIFIER FOR
WARM AIR FURNACES
Henry A. Zach, Winnebago, Nebr.
Filed Oct. 21, 1965, Ser. No. 499,666
4 Claims. (Cl. 126—113)

My invention relates to a fuel conserving device and humidifier for warm air furnaces.

An object of my invention is to provide a device which will conserve a substantial part of the heat which ordinarily passes into the chimney of a furnace, and to redirect such heat into the rooms heated by the furnace.

A further object of my invention is to provide an arrangement which will also add moisture to the rooms and thereby provide a humidifying arrangement.

A further object of my invention is to provide an arrangement which will have the characteristic of settling off hard water particles in those furnaces using hard water, and wherein such calcium and other particles can be drained off when desired.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figures 1, 2:
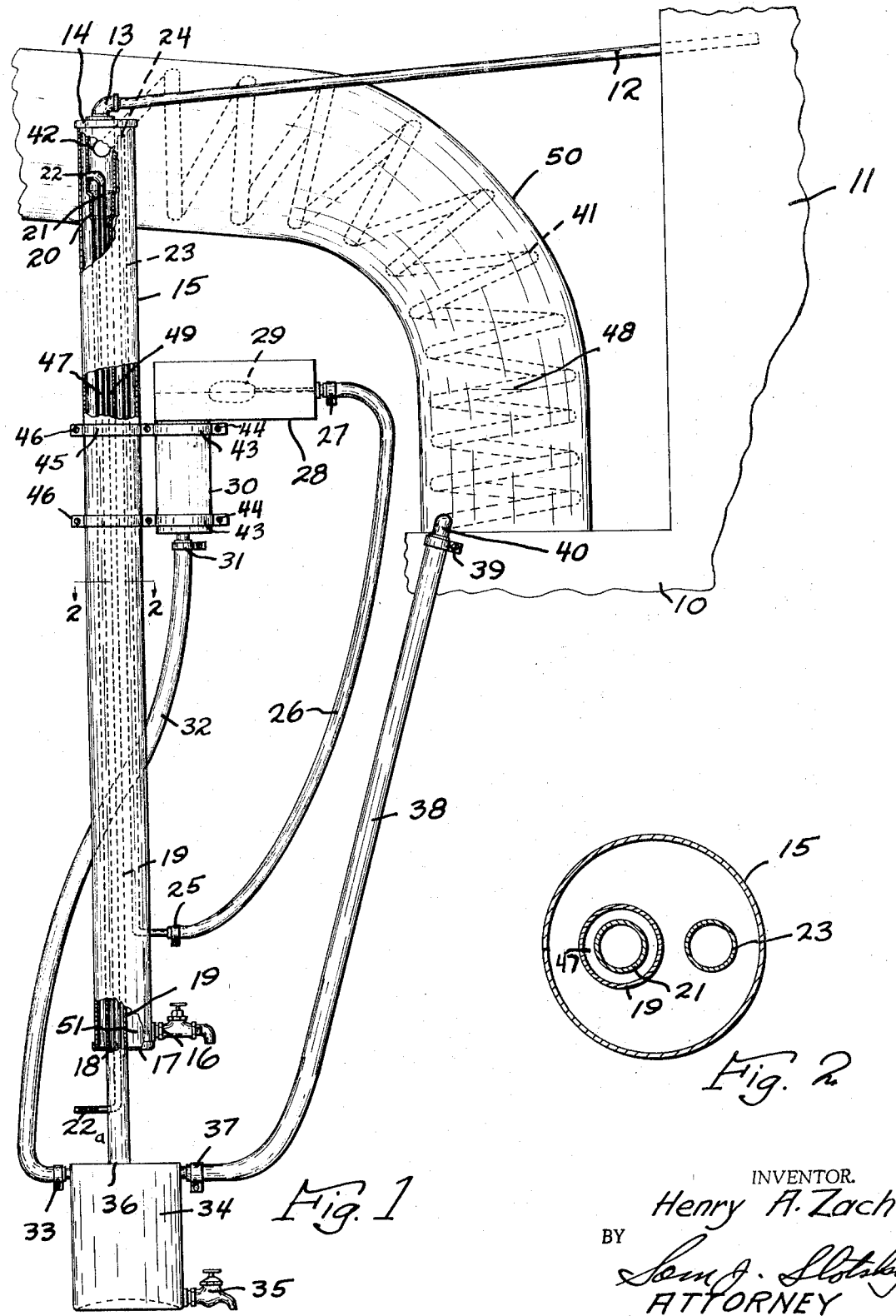
FIGURE 1 is a side elevation of the unit as attached to a furnace.
FIGURE 2 is an enlarged cross-sectional view taken substantially along the lines of 2—2 of FIGURE 1.

My invention contemplates the provision of an arrangement which can be attached to a standard hot air furnace and which arrangement, by conserving a large portion of the heat passing into the chimney, will result in a considerable saving in fuel. My invention further contemplates a humidifying arrangement as well as an arrangement for gathering or separating the elements from the water, such as calcium and the like, and which can be readily drained off at intervals.

In describing my invention, I have used the numeral 10 to designate the lower body of a hot air furnace and the character 11 to designate the plenum chamber which communicates to the usual warm air ducts.

The character 12 indicates a tube communicating to the plenum chamber 11, and the numeral 13 indicates an elbow attached to the tube 12, and which elbow passes through the cap 14 which is at the top of the outer cylindrical tube 15. Communicating with the tube 15 and at the bottom thereof, is a valved tap 16; and the numeral 17 indicates a lower cap member attached to the tube 15.

Communicating through the cap 17 as at 18 is a vertically positioned tube 19 which communicates with the elbow 13, and which extends into the upper tapered neck portion 20, and passing through the upper portion 20 is the inner tube or pipe 21, which tube 21 communicates at 22a to the desired water pressure source, which is usually approximately double the normal atmospheric pressure.

The numeral 23 indicates a still further tube which is open at its upper end 24, the tube 23 being attached as at 25 to the flexible tube 26 which is attached as at 27 to a float level box unit 28 having a float valve 29, and communicating with the box 28 is the cylindrical vertical tube 30.

Attached at 31 to the member 30 is a further resilient tube 32 which is attached at 33 to a reservoir 34, having a further valved tap 35 at the bottom thereof as shown.

The tube 19 communicates at 36 with the reservoir 34, and attached at 37 to the reservoir 34 is a further tube 38 which is attached at 39 to the elbow 40, which communicates with the helically coiled tube 41, which communicates at 42 at its upper end to the tubular member 19.

Attached to the member 30 are the clamps 43 which are attached by means of the screws 44 and which clamps are further attached to the further clamps 45 which are clamped to the tube 15 by means of the screws 46; this arrangement permitting adjustable vertical movement of the float member to adjust the level of the water in the coil 41 as well as in the space 47 between the tubes 21 and 19.

The tube 15 and the float, etc. can be attached in any desired manner by suitable means to the furnace.

The apparatus functions in the following manner. The water under pressure which is admitted at 22a into the vertical inner tube 21, will pass into the space between the tubes 15 and 19. This water will also pass through the upper opening 24 downwardly through the tube 23 and into the float unit 28, the float member 29 fixing the vertical heighth of the water as shown at 48 within the coil 41 and at 49 between the tubes 19 and 21. The coil 41 is mounted within the chimney flue portion 50, and the hot flue gas passing through the chimney 50 will heat the coil 41 and the water contained therein which water will thereby be converted into steam and which steam will pass through the pipe 12 into the plenum chamber 11 and into the rooms of the building, thereby re-directing a greater portion of the heat which would normally escape, into the rooms and also providing an efficient humidifying effect due to the moisture in the steam.

The hard calcium compounds and other particles in the water also will settle in the bottom of the tube 15 or within the area 51 which hard particles can be drawn off the tap 16 whenever desired, and also any excess water which may be thrown over from the coil 41 into the tube 19, will pass into the lower reservoir 34 which can also be drawn off when desired.

The level of the water in the unit can be adjusted as explained above so that the user of the arrangement can effectively fix the water level where desired consistent with the conditions encountered, etc.

I have found that by the use of the elongated vertical tubes, etc., an efficient arrangement is thus provided having maximum heat conserving properties and the like. For instance, the lengthened tubes provide means for preheating the water before being used in the coil 41 to generate steam, the lengthened tubes also permitting a more efficient settling of the hard water particles.

It will now be noted that I have provided the advantages mentioned in the objects of my invention, with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a warm air furnace and the flue pipe thereof, a helical tubular coil in said flue pipe, means for providing a water supply in said tubular coil including an outer elongated vertically positioned tube, an inner tube received in said outer tube, a further inner tube positioned within said inner tube, means for providing a water supply under pressure through said further inner tube, said further inner tube communicating through said inner tube at its upper end to the space between said outer tube and said inner tube, means communicating from the lower end of said inner tube and the lower end of said tubular coil, said inner tube having an inlet opening at its upper end communicating to the upper end of said tubular coil, and also having a further outlet opening.

2. In combination with a warm air furnace and the flue pipe thereof, a helical tubular coil in said flue pipe, means for providing a water supply in said tubular coil including an outer elongated vertically positioned tube, an inner tube received in said outer tube, a further inner tube psoitioned within said inner tube, means for providing a water supply under pressure through said further inner tube, said further inner tube communicating through said inner tube at its upper end to the space between said outer tube and said inner tube, means communicating from the lower end of said inner tube and the lower end of said tubular coil, said inner tube having an inlet opening at its upper end communicating to the upper end of said tubular coil, and also having a further outlet opening, a settling tank positioned at the lower end of said inner tube and communicating therewith, a tap valve for drawing off water borne particles attached to said settling tank.

3. In combination with a warm air furnace and the flue pipe thereof, a helical tubular coil in said flue pipe, means for providing a water supply in said tubular coil including an outer elongated vertically positioned tube, an inner tube received in said outer tube, a further inner tube positioned within said inner tube, means for providing a water supply under pressure through said further inner tube, said further inner tube communicating through said inner tube at its upper end to the space between said outer tube and said inner tube, means communicating from the lower end of said inner tube and the lower end of said tubular coil, said inner tube having an inlet opening at its upper end communicating to the upper end of said tubular coil, and also having a further outlet opening, a settling tank positioned at the lower end of said inner tube and communicating therewith, a tap valve for drawing off water borne particles attached to said settling tank, a further tap valve positioned at the lower end of said outer tube for drawing off further water borne particles settling at the bottom of said outer tube.

4. In combination with a warm air furnace and the flue pipe thereof, a helical tubular coil in said flue pipe, means for providing a water supply in said tubular coil including an outer elongated vertically positioned tube, an inner tube received in said outer tube, a further inner tube positioned within said inner tube, means for providing a water supply under pressure through said further inner tube, said further inner tube communicating through said inner tube at its upper end to the space between said outer tube and said inner tube, means communicating from the lower end of said inner tube and the lower end of said tubular coil, said inner tube having an inlet opening at its upper end communicating to the upper end of said tubular coil, and also having a further outlet opening, a settling tank positioned at the lower end of said inner tube and communicating therewith, a tap valve for drawing off water borne particles attached to said settling tank, a further tap valve positioned at the lower end of said outer tube for drawing off further water borne particles settling at the bottom of said outer tube, a still further tube positioned within said outer tube having an open upper end, a float unit adjustably attached to said outer tube, tubular means attached between the lower end of said still further tube and said float unit, a steam passage pipe communicating between the upper end of said outer tube and the plenum chamber of said furnace.

References Cited by the Examiner
UNITED STATES PATENTS 2,069,145  1/1937  Hastings et al. _____ 126—113 X
2,133,599  10/1938  Turney _____ 126—113 X JAMES W. WESTHAVER, *Primary Examiner.*